US005404575A

United States Patent [19]

Lehto

[11] Patent Number: 5,404,575

[45] Date of Patent: Apr. 4, 1995

[54] METHOD FOR RADIOSYNCHRONIZATION OF BASE STATIONS IN A SIMULCASTING NETWORK

[75] Inventor: Pekka Lehto, Espoo, Finland

[73] Assignee: Tecnomen Oy, Espoo, Finland

[21] Appl. No.: 888,913

[22] Filed: May 26, 1992

[30] Foreign Application Priority Data

Mar. 5, 1992 [FI] Finland .................................. 920976

[51] Int. Cl.[6] ............................................ H04B 7/00

[52] U.S. Cl. .................................. 455/51.1; 455/56.1; 375/356

[58] Field of Search .................... 455/51.1, 51.2, 13.2, 455/53.1, 56.1, 18, 69, 67.1, 67.5, 49.1, 57.1, 33.1; 375/107; 370/100.1, 103; 340/825.44; 379/59, 60

[56] References Cited

U.S. PATENT DOCUMENTS

| | | | |
|---|---|---|---|
| 4,718,109 | 1/1988 | Breeden et al. | 455/51.2 |
| 4,939,752 | 7/1990 | Literati et al. | 455/51.1 |
| 5,038,403 | 8/1991 | Leitch | 455/51.2 |
| 5,068,877 | 11/1991 | Near et al. | 375/107 |
| 5,124,698 | 6/1992 | Mustonen | 455/51.1 |
| 5,257,404 | 10/1993 | Goreham et al. | 455/69 |

FOREIGN PATENT DOCUMENTS

| | | |
|---|---|---|
| 0198448 | 10/1986 | European Pat. Off. . |
| 0286614 | 10/1988 | European Pat. Off. . |
| 0328385 | 8/1989 | European Pat. Off. . |

OTHER PUBLICATIONS

Copy of results of a DIALOG search on EP Appln. No. 0197556 is attached.

*Primary Examiner*—Edward F. Urban
*Assistant Examiner*—Nguyen Vo
*Attorney, Agent, or Firm*—Robert P. Simpson; Michael L. Dunn

[57] ABSTRACT

A method for radiosynchronization of base stations in a simulcasting network which includes a plurality of base stations to be synchronized, comprising the following steps: a.) a first set of base stations transmitting respective synchronization signals; b.) a second set of base stations receiving at least one of the respective synchronization signals for the purpose of determining several estimates of synchronization error, where each of the several estimates is an estimate of synchronization error between one of the first set of transmitting base stations and one of the second set of receiving base stations; and, c.) adjusting subsequent transmissions of particular base stations to minimize synchronization errors between base stations within the first or second set to achieve simulcast transmission of all base stations in the network, wherein the adjustment is made based upon the several estimates, and wherein each of the several estimates was obtained based upon a synchronization signal which was either received or transmitted by the particular base station being adjusted.

5 Claims, 2 Drawing Sheets

METHOD FOR RADIOSYNCHRONIZATION OF BASE STATIONS IN A SIMULCASTING NETWORK

BACKGROUND OF THE INVENTION

The present invention relates to a method for radiosynchronization of base stations in a simulcasting network which includes a plurality of base stations (BS) in a synchronization area, i.e. base stations that must be synchronized to each other.

As to the general description of the simulcasting paging network, reference is made to European patent application EP-0197556, which shows a prior art method for the radio synchronization of base stations in a paging network.

Simulcasting paging networks operate in a quasi synchronous manner. Several transmitters of base stations transmit the same information simultaneously in order to achieve large and continuous coverage. A problem is in that a paging receiver may be located within the coverage areas of two transmitters. Since transmitters operate on the same frequency, they interfere with each other unless synchronized.

The purpose of synchronization of the paging base stations is to get the base stations to transmit the same information at exactly the same instant (so-called quasi synchronous transmission). In wide area paging systems with digital information, this means that the same information symbol (a data bit) is transmitted from various base stations at exactly the same time. According to one of the standards, for instance, transmission is quasi synchronous if the phase difference of symbols transmitted by various base stations, upon the arrival thereof in a paging receiver, does not exceed ¼ of the time required by transmission of the symbol.

As transmission speed increases, the requirement for synchronization will be stricter since the duration of a symbol becomes shorter.

For instance in a wide area paging system there may be set a practical requirement that no more than ±10 microseconds difference can be accepted in timing of transmissions from adjacent base stations. This requirement of accuracy could be met by high-precision time reference (atomic clock), which is synchronized to a certain time reference, or with continuous reception of time from a high-precision time reference. Both of these are far too expensive. Therefore a preferred solution is to provide a base station with a quartz oscillator as time reference and to synchronize the clocks of the base stations periodically to each other by using radio path for the transmission of synchronization signal.

The preferred embodiment of the method according to the present invention resembles the prior art method according to EP-0197556 in that the base stations receive from a common controller a synchronization plan, which includes selection of base stations for sending the sync message in a given order and at predefined times. In the prior art method the synchronization plan includes also a predefined route along which the synchronization propagates from one base station to the other. In other words, when a base station is sending the sync message, there is a predefined base station which synchronizes its clock to the clock of the sending base station, whereafter the predefined base station starts sending the sync message. This predefined route of synchronization causes, however, some drawbacks in that the synchronization plan becomes complicated and the synchronization is sensitive to errors. One disturbance in reception of the sync message results in erroneous synchronization.

SUMMARY OF THE INVENTION

The present invention comprises a method for radiosynchronization of base stations in a simulcasting network which includes a plurality of base stations in a synchronization area. The method includes the steps of: a first set of base stations transmitting a synchronization signal; a second set of base stations receiving at least one of the transmitted synchronization signals and calculating several estimates of synchronization error, wherein each of the several estimates is an estimate of synchronization error between one of the transmitting base stations and one of the receiving stations; and adjusting the timing of subsequent transmissions of at least one of the base stations by utilizing the estimates to determine the adjustment, wherein each of the estimates is an estimate based on a synchronization signal which was either transmitted or received by a particular base station being adjusted.

The objective of the present invention is to achieve an improved synchronization method which enables high accuracy synchronization with simple synchronization plan and with excellent ability to tolerate errors for instance in receiving the synchronization signals.

This objective is achieved on the basis of the features set forth in the annexed claims.

BRIEF DESCRIPTION OF THE DRAWINGS

The method according to the preferred embodiment of the present invention will now be described with reference to the enclosed drawings, wherein.

DESCRIPTION OF THE PREFERRED EMBODIMENT

The paging messages are sent from a public telephone network to a paging system controller PSC, which sends the paging messages to base stations BS. The paging system controller PSC includes one or more synchronization controllers SC and each synchronization controller SC controls the synchronization of a plurality of base stations BS in a synchronization area. This control includes a. o. sending commands to base stations to initialize clocks, to perform sync cycle, receiving observations (estimates of synchronization error) from base stations, evaluating clock corrections on the basis of said observations and, sending the clock corrections to base stations for adjusting the timing of subsequent transmissions of the base stations. The communication between PSC/SC and BSs takes place e.g. via lines. Each base station BS has a base station controller BSC which communicates with PSC and SC and controls transmitter Tx and receiver Rx of the base station.

The base station controller BSC must be able to record the instants of edges of the demodulated signal obtained from the receiver, and initialize and adjust its internal time reference (clock).

In a preferred embodiment of the invention, the synchronization controller SC initiates a synchronization cycle at suitable intervals. These synchronization cycles are executed according to a synchronization plan. The plan defines which base stations BS should transmit a synchronization signal and when (according to the clock of the base station) each such base station BS should do that. The synchronization plan (more precisely, the plan of sync signal transmissions for the next sync cycle) will be described later in more detail.

Each base station BS has an identifier which is unique within the network and which is known by the BS itself and by the synchronization controller SC.

In order to initialize the clocks of the BSs the SC sends the time of its clock to the BSs, for instance, associated with each sending of the plan of sync signal transmissions for the next sync cycle. If a BS has not been synchronized since it was reset, it transfers the received time to its clock. After this the difference of the times of the clocks of the SC and the said BS has an uncertainty which is caused mainly by the uncertainty of the delay of communications from the SC to the BS.

Figure 2:
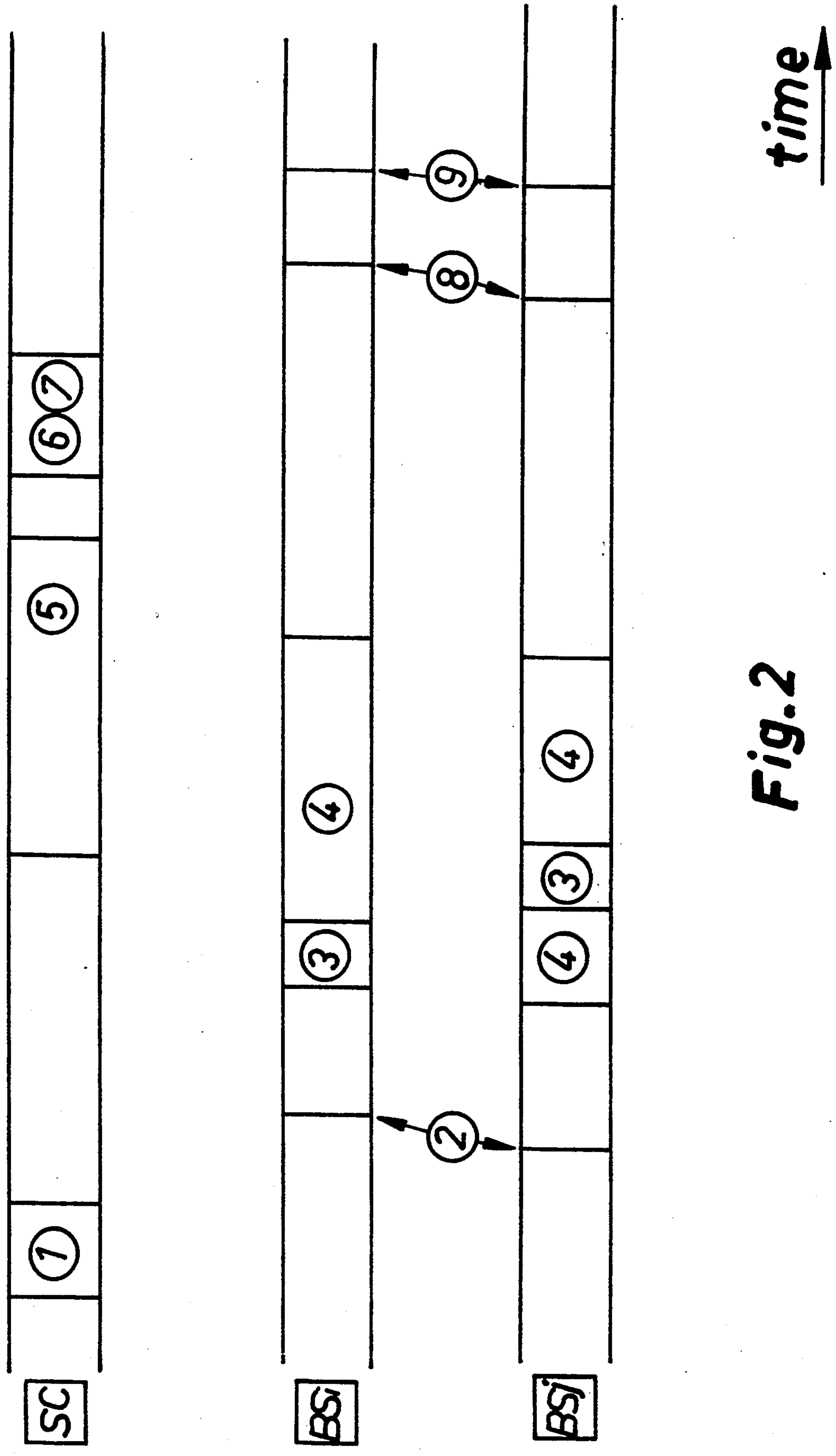
FIG. 2 illustrates, for one synchronization cycle, the timing of main synchronization operations in the synchronization controller (SC) and in base stations (only two base stations BSi and BSj are shown).

In FIG. 2, the numbered operations are as follows:

1. The SC has decided when the next sync cycle should take place. Well before that time the SC generates a plan of sync signal transmissions for the said next sync cycle and sends the plan to the BSs. This plan contains:

identifiers of the base stations (e.g. BSi, BSj) that are intended to transmit a sync signal; and for each such base station the intended time of the said transmission.

2. The base stations BS receive the plan.

3. A base station BS transmits a sync signal when the time according to its clock equals the intended time of transmission for this base station BS (obtained from the received plan).

4. Base stations BS which do not transmit try to receive the sync signal. When a base station BS receives a sync signal it records what the time of reception of the signal was according to its clock, and it evaluates an estimate of synchronization error between the transmitting BS and the receiving BS (this evaluation is described in detail later).

Each BS sends to the SC each such estimate associated with identifiers of the transmitting BS and the receiving BS.

5. The SC receives from the BSs the estimates of sync error that were obtained during the sync cycle in question.

6. When a predefined time interval has elapsed since the last intended time of transmission of the sync cycle, the SC evaluates a timing adjustment for each BS, based on the estimates. (this evaluation is described in detail later).

7. The SC sends to each BS the timing adjustment for that BS.

8. Each BS receives its timing adjustment.

9. Each BS adjusts its clock by the amount of the timing adjustment.

As said before, the plan of sync signal transmissions for the next sync cycle is defined in the synchronization controller SC. The simplest solution is to command all the BSs to transmit once during the sync cycle.

Every BS can be given a time slot for transmitting the sync signal if we want to be sure that the transmissions do not overlap. Then, the length of each such time slot should be the sum of:

the predefined fixed length of the sync signal, and a time margin which depends on the estimated upper bound of the difference in the clocks of the BSs.

When a base station BS transmits the synchronization signal, all base stations which are not transmitting try to receive the signal. The synchronization signal or sync message has first a fixed part which is a predetermined sequence of digital pulses (ones and zeros), each of accurate predetermined length. This sequence as a whole must not be periodic. (It must be possible to unambiguously determine a reference point of the sequence when it is received.)

In addition to that an identifier of the transmitting BS may be transmitted in the sync message. The identifier of the transmitting BS is preferably transmitted in sync messages because otherwise it is difficult for a receiving base station to determine the transmitting base station;

if the receiving BS is totally out of sync with respect to transmitting BS (timing uncertainty more than a few milliseconds)

if several BSs transmit simultaneously (either in the same network or in adjacent networks).

Also, the time of transmission of the sync message may be sent as part of the sync message.

At each receiving base station BS the time of reception of a reference point of a received sync message must be determined accurately. This can be done e.g. as follows. The instants of edges of the received and demodulated signal are recorded. The recorded pattern of pulses is compared to the predefined fixed part of the sync signal. The correspondence of the edges of these patterns is determined. The time of reception of the reference point of the sync signal is estimated from one or several of the recorded instants of the received edges.

The purpose of sending and receiving the synchronization signal is to find out an estimate of synchronization error between the transmitting BS and the receiving BS, i.e. an estimate of the difference in the times when these BSs transmit the same paging signal during paging transmissions. In this description of the present invention, the sync error between the transmitting BS and the receiving BS is defined to be positive if the receiving BS transmits the paging signal before the transmitting BS, and negative in the opposite case. Then, the basic component of the estimate of sync error is the difference of the following times of clocks of the two BSs, so that the former of the times is subtracted from the latter one:

the time of transmission of a reference point of the transmitted sync signal according to the clock of the transmitting BS;

the time of reception of the corresponding point in the received and demodulated sync signal according to the clock of the receiving BS.

In the critical signal path, the above times of clocks refer to the timing of the relevant signal between BSC and radio equipment Tx/Rx of each BS. (When a sync signal is transmitted, the critical signal path goes from the BSC of the transmitting BS to the Tx of the transmitting BS; from there via radio path to the Rx of the receiving BS and from there to the BSC of the receiving BS). The receiving base station can find out the former time in several ways. One alternative is to send the time of transmission as part of the sync message from the transmitting BS to the receiving BS. Another alternative is to send as part of the sync message an identifier of the transmitting BS and to search for this identifier from the plan of sync signal transmissions in order to find its associated time of transmission.

A more accurate estimate of the sync error is obtained when estimates of the following delays are subtracted from the difference of the times of clocks:

transmitter-receiver-loop delay of the receiving BS;

propagating delay on direct path between the two BSs.

Estimates of the above delays can be obtained as explained in prior art patent application EP-0197556.

Because several BSs may receive the same sync signal from one and the same base station BS, there are several observations (=estimates of synchronization error) obtained by one sync message transmission. The number of observations (estimates of sync error) is further increased when the base stations, after transmitting the sync signal, receive the sync signals from adjacent base stations which already received the sync signal from the receiving base station.

Figure 1:
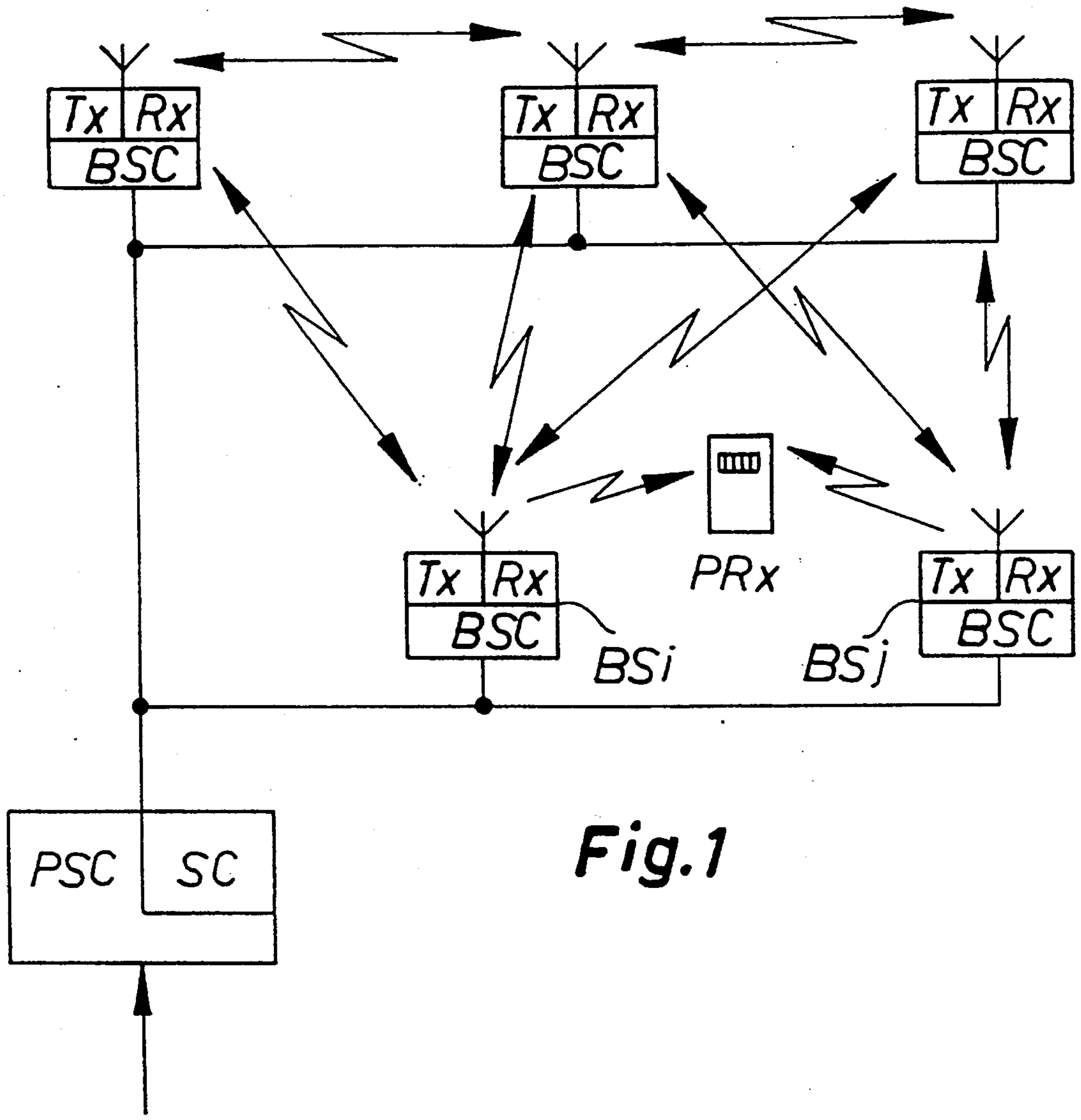
FIG. 1 shows a schematic representation of a paging network.
Figure 3:
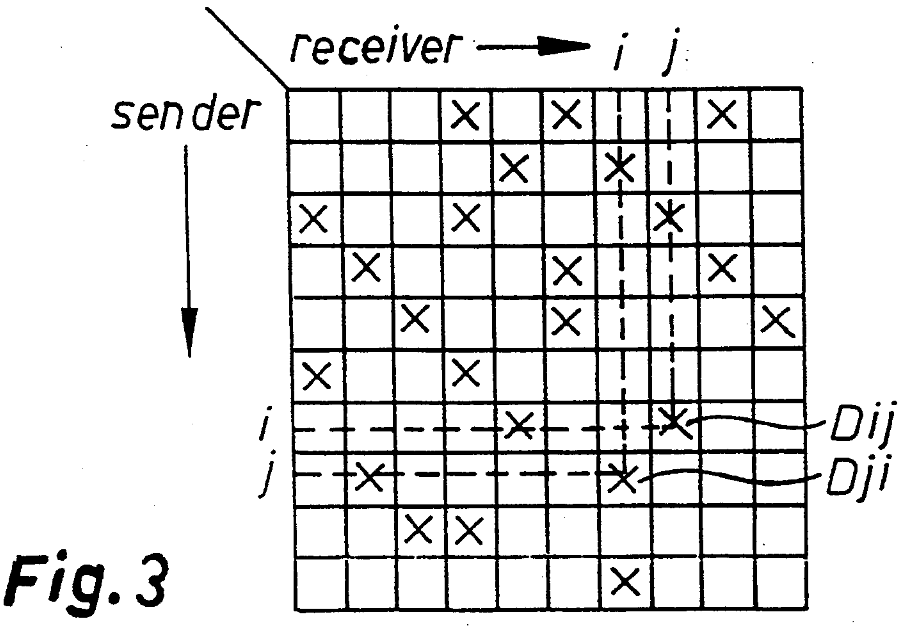
FIG. 3 shows, for illustrating one aspect of the invention, the evaluated estimates of synchronization error in a matrix.

Because there are several estimates of sync error obtained for adjusting the timing of each one of the base stations, the possibility of errors can be minimized. FIG. 3 illustrates this feature of the invention in the form of a matrix wherein an example of obtained estimates of sync error between BSs have been marked by "x". As can be seen, there are several of the estimates for each BS, in which estimates the same BS is either the transmitting BS or the receiving BS.

In the invention it is essential that the timing of subsequent transmissions of each base station is adjusted so that for as many adjustments as possible several estimates of sync error are used. Based on the several estimates of sync error it is possible, e.g. by means of the least squares method, to find out the adjustments that are needed to reduce or minimize the future sync errors. All estimates of sync error which are within predefined acceptable limits are processed in one synchronization controller SC to evaluate the timing adjustments needed for each base station. Of course the above study concerns a predetermined number of base stations at a predefined sync area.

In the evaluation of the timing adjustments (relative clock corrections) for the base stations, the aim is to evaluate a set of clock corrections $C_{1 \ldots n}$ (n=number of BSs to be synchronized) such that subsequent sync errors between BSs will become sufficiently small after each of the clock corrections $C_{1 \ldots n}$ is sent to the corresponding BS ($BS_{1 \ldots n}$) and added to the clock of that BS. This evaluation can be illustrated with the following notations:

Dij=estimate of sync error between BSi and BSj that was obtained based on sync signal which was transmitted by BSi and received by BSj Ci,Cj=timing adjustments (clock corrections) to be evaluated for BSi and BSj.

Imagine that the clock corrections $C_{1 \ldots n}$ were added to the clocks of the BSs. Then, to correct the estimate of sync error Dij to reflect how the added clock corrections $C_{1 \ldots n}$ affect this sync error we should change each estimate Dij to $$Dij - Ci + Cj$$

This is what the sync error in question could be estimated to be after adjusting the clocks by adding the corrections $C_{1 \ldots n}$.

This corrected estimate of sync error, as well as all other corresponding estimates of sync error between any two base stations, should be near zero in order to decrease or minimize the synchronization errors between the base stations. This is the essential requirement for the algorithms for the evaluation of required timing adjustments (clock corrections). A general solution for the required set of corrections $C_{1 \ldots n}$ can be obtained by means of the known least squares method. Then, the function to be minimized is $$f(C_1, C_2, \ldots, C_n) = \sum_{i,j} (Dij - Ci + Cj)^2$$

Here, of course, when an acceptable estimate of some sync error is not available, the corresponding square of the corrected estimate must be absent, i.e. the sum should be evaluated based on those and only those estimates Dij that were obtained during the sync cycle in question.

The estimates of sync error between BSs give us information of relative timing, not of absolute timing. (If we add the same offset to every $C_{1 \ldots n}$ the values of the corrected estimates do not change.) Thus, the minimum value of the function to be minimized is obtained with an infinite number of sets of clock corrections $C_{1 \ldots n}$, differing from each other by having different offset but being otherwise equal. Then, if one said solution for the set of $C_{1 \ldots n}$ is known, a preferred solution can be obtained, if needed, by choosing a suitable offset and adding this offset to every $C_{1 \ldots n}$.

The invention is not limited to the above described embodiment but many kinds of variations and combinations of the above disclosed features in view of the prior art are obvious to a skilled person and are therefore part of the invention in the scope of the following claims.

I claim:

1. A method for radiosynchronization of base stations in a simulcasting network which includes a synchronization controller and a plurality of base stations to be synchronized, said plurality of base stations comprising a first set of base stations and a second set of base stations, comprising the following steps:

a.) said first set of base stations transmitting respective synchronization signals;

b.) said second set of base stations receiving at least one of said respective synchronization signals for the purpose of determining several estimates of synchronization error, where each of said several estimates is an estimate of synchronization error between one of said first set of transmitting base stations and one of said second set of receiving base stations, and wherein a component of the estimate of synchronization error is evaluated as a difference of 1) instant of transmission of the synchronization signal according to a clock of a sending base station; and 2) instant of reception of the synchronization signal according to a clock of a receiving base station;

c.) sending said several estimates of synchronization error to said synchronization controller; and, d.) said synchronization controller adjusting timing of subsequent transmission of a particular base station within said first or second set of base stations to minimize synchronization errors between base stations within said first or second set to achieve simulcast transmission of all said base stations in said network, wherein said adjustment is made based upon said several estimates, and wherein each of said several estimates was obtained based upon a synchronization signal which was either received or transmitted by the particular base station being adjusted.

2. A method for radiosynchronization of base stations in a simulcasting network which includes a synchronization controller and a plurality of base stations to be synchronized, said plurality of base stations comprising a first set of base stations and a second set of base stations, comprising the following steps:

a.) said first set of base stations transmitting respective synchronization signals;

b.) said second set of base stations receiving at least one of said respective synchronization signals for the purpose of determining several estimates of synchronization error, where each of said several estimates is an estimate of synchronization error between one of said first set of transmitting base stations and one of said second set of receiving base stations, and wherein a component of the estimate of synchronization error is evaluated as a difference of 1) instant of transmission of the synchronization signal according to a clock of a sending base station; and 2) instant of reception of the synchronization signal according to a clock of a receiving base station;

c.) sending said several estimates of synchronization error to said synchronization controller; and, d.) said synchronization controller adjusting timing of subsequent transmission of a particular base station within said first or second set to reduce synchronization error between all said base stations in said network, wherein said adjustment is made based upon at least two of said several estimates, and wherein each of said at least two of said several estimates was obtained based upon a synchronization signal which was either received or transmitted by the particular base station being adjusted.

3. The method according to claim 1, wherein timing of subsequent transmission of said particular base station is adjusted based upon at least two of said several estimates.

4. The method of claim 1, wherein said synchronization controller defines a synchronization plan comprising:

a) selecting base stations for transmitting the synchronization signal(s); and b) for each base station selected to transmit, determining the time for transmitting the synchronization signal.

5. The method of claim 1, wherein said several estimates of synchronization error are processed in said synchronization controller to evaluate timing adjustments needed for each base station.

* * * * *